US00RE35280E

United States Patent [19]

Orton et al.

[11] E Patent Number: Re. 35,280

[45] Reissued Date of Patent: Jun. 18, 1996

[54] COPOLYMERIZATION OF UNSATURATED URETHANE MONOMERS

[75] Inventors: Michael L. Orton, Northwich; William I. Spurr, Warrington, both of England

[73] Assignee: Imperial Chemical Industries PLC, London, England

[21] Appl. No.: 196,912

[22] Filed: Dec. 15, 1993

Related U.S. Patent Documents

Reissue of:

[64] Patent No.: 4,480,079
Issued: Oct. 30, 1984
Appl. No.: 438,348
Filed: Nov. 1, 1982

U.S. Applications:

[63] Continuation of Ser. No. 924,807, Oct. 30, 1986, abandoned, which is a continuation-in-part of Ser. No. 367,617, Apr. 12, 1982, abandoned.

[30] Foreign Application Priority Data

| | | | |
|---|---|---|---|
| Apr. 28, 1981 | [GB] | United Kingdom | 8113121 |
| Jul. 10, 1981 | [GB] | United Kingdom | 8121379 |

[51] Int. Cl.[6] ..... C08F 26/02

[52] U.S. Cl. ..... 526/301

[58] Field of Search ..... 526/301

[56] References Cited

U.S. PATENT DOCUMENTS

| | | | |
|---|---|---|---|
| 3,825,518 | 7/1974 | Foster | 526/227 |
| 3,856,830 | 12/1974 | Kuehn | 260/404.5 |
| 3,954,714 | 5/1976 | Kuehn | 526/301 |
| 4,192,762 | 3/1980 | Osborn | 252/182 |
| 4,422,996 | 12/1983 | Navin et al. | 264/255 |

FOREIGN PATENT DOCUMENTS

| | | |
|---|---|---|
| 0039588 | 11/1981 | European Pat. Off. . |
| 2209149 | 9/1973 | Germany . |
| 1373182 | 11/1974 | United Kingdom . |

*Primary Examiner*—Thurman K. Page
*Assistant Examiner*—Peter F. Kulkosky
*Attorney, Agent, or Firm*—Cushman Darby & Cushman

[57] ABSTRACT

Moulded plastics products are produced by in-mould copolymerization of methyl methacrylate with a polyurethane polyacrylate or polymethacrylate derived from a hydroxyalkyl acrylate or methacrylate by reaction of hydroxyl groups thereof with the isocyanate groups of a polyisocyanate or urethane polyisocyanate having isocyanate functionality greater than 2.0.

30 Claims, No Drawings

COPOLYMERIZATION OF UNSATURATED URETHANE MONOMERS

Matter enclosed in heavy brackets [ ] appears in the original patent but forms no part of this reissue specification; matter printed in italics indicates the additions made by reissue.

[This application] *This is a continuation of Application Ser. No. 06/924,807 filed Oct. 30, 1986 abandoned which is a reissue of Appln. Ser. No. 438,348 now U.S. Pat. No. 4,480,079, issued on Oct. 30, 1984, which* is a continuation-in-part of application Ser. No. 367,617, filed Apr. 12, 1982, now abandoned.

This invention relates to the copolymerisation of unsaturated urethane monomers and more particularly to the 'in mould' copolymerisation of certain polyurethane polyacrylates and polymethacrylates, and compositions for use therein.

A potentially attractive and economical method of manufacturing moulded plastics articles and components is to introduce a polymerisable liquid composition into a mould and to effect rapid "in mould" polymerisation. In such a moulding process it is desirable that the time required for polymerisation is less than 10 minutes, preferably 5 minutes or less (if possible less than 2 minutes). It is also desirable that such rapid polymerisation may be achieved at ambient temperatures or at temperatures not greatly elevated above ambient, for example at initial mould temperatures of 60° C. or below.

The properties required is a polymerisable composition for use in such a moulding process are thus distinct from those required in other compositions, for example compositions intended to be used in the protective coating of substrates. The applicability of such moulding processes to the polymerisation or copolymerisation of vinylic monomers has hitherto been greatly restricted by the lack of polymerisable compositions capable of being polymerised at the required rate at an appropriate temperature to yield a polymerised product sufficiently rigid to be removed from the mould.

In U.S. Pat. No. 3,856,830 and its divisional U.S. Pat. No. 3,954,714 there are described certain ethylenically-unsaturated urethane monomers comprising the reaction product of (a) an organic polyisocyanate having at least 3 isocyanate groups and (b) a stoichiometric quantity of a hydroxyl-terminated ethylenically-unsaturated ester for reacting with each of said isocyanate groups. The urethane monomers described may be derived from a variety of hydroxyl-terminated esters, and the said monomers may be used in the preparation of a variety of homopolymers and copolymers, as well as mixed resins. Examples are given of the preparation of copolymers with styrene, styrene/butyl methacrylate and styrene/divinyl benzene. It is taught therein that in most instances it has been found desirable to first react the subject reactants at room temperature for about 16 to 24 hours, and then post cure the resulting product at temperatures within the range of 80° C. to 175° C. for 1 to 6 hours.

We have now found that rapid in-mould polymerisation may advantageously be achieved by the use of certain polyurethane polyacrylates or polymethacrylates in combination with methyl methacrylate as comonomer.

According to the present invention there is provided a method of producing a moulded plastics product by in-mould copolymerisation of an unsaturated urethane compound and a vinyl monomer copolymerisable therewith, characterised in that (a) the unsaturated urethane compound is a polyurethane polyacrylate or polymethacrylate resin derived from a hydroxyalkyl acrylate or methacrylate by reaction of hydroxyl groups thereof with the isocyanate groups of
  (i) a polyisocyanate free from urethane groups and having an isocyanate functionality greater than 2.0 or
  (ii) a urethane polyisocyanate derived from a polyisocyanate by reaction thereof with the hydroxyl groups of an aliphatic alcohol having up to 3 hydroxyl groups, the said urethane polyisocyanate having an isocyanate functionality greater than 2.0 and (b) the vinyl monomer is methyl methacrylate.

The hydroxyalkyl acrylate or methacrylate preferably contains from 2 to 4 carbon atoms in the hydroxyalkyl group; 2-hydroxyethyl and 2-hydroxypropyl acrylates and methacrylates are especially preferred.

When the polyurethane polyacrylate or polymethacrylate is derived from a urethane polyisocyanate the latter is preferably a polyurethane polyisocyanate which is in turn derived by reaction of an aliphatic diol or triol with a polyisocyanate which itself has an isocyanate functionality greater than 2.0.

The polyisocyanates especially preferred both for direct reaction with the hydroxyalkyl acrylate or methacrylate and for preparation of an intermediate polyurethane polyisocyanate, are polymethylene polyphenyl polyisocyanates.

When the polyurethane polyisocyanate is derived from a diisocyanate (for example diphenylmethane-4,4'-diisocyanate or other aromatic diisocyanate) reaction with a triol will be necessary in order to yield a polyurethane polyisocyanate having the desired isocyanate functionality of greater than 2.0.

Suitable diols and triols include those conventionally used in the art for producing urethanes by reaction of a polyol with an isocyanate. Suitable diols include glycols of the formula HO—Q—OH, where Q is an alkylene or polyalkylene ether radical; dihydric phenols and bisphenols for example 2,2-bis (4-hydroxyphenyl) propane (Bisphenol A) and bis (4-hydroxyphenyl) sulphone (Bisphenol S). Suitable triols include glycerol, trimethylol propane (1,1,1-tris (hydroxymethyl)-propane) and ethoxylated or propoxylated derivatives thereof.

The reaction product may also contain a proportion of one or more polyurethanes of higher molecular weight derived by reaction of the above product with further molecules of polyol and polyisocyanate.

The isocyanate functionality (i.e. average number of isocyanate groups per molecule) of the polyisocyanate (or the polyurethane polyisocyanate) employed is preferably at least 2.2. A functionality of at least 2.5 (for example from 2.5 to 3.0) is especially preferred. The polyisocyanate may be an individual polyisocyanate or may be a mixture of polyisocyanates having an average functionality as specified herein.

In the preparation of a polyurethane polyisocyanate, the proportions of polyisocyanate and polyol are chosen so that all the hydroxyl groups of the polyol are converted into urethane groups. Consequently the isocyanate functionality of the polyurethane polyisocyanate will be greater than the isocyanate functionality of the polyisocyanate used as starting material. Thus for example, if the polyisocyanate starting material has a functionality (n) of 2.5 the isocyanate functionality of the polyurethane polyisocyanate derived from a diol will be 2n–2=3.0.

Whichever particular polyol is used, the relative proportions of polyol and polyisocyanate and/or the isocyanate functionality of the polyisocyanate is chosen so as to yield the required isocyanate functionality in the polyurethane polyisocyanate.

The polyurethane polyacrylates or polymethacrylates of the present invention may be prepared by reaction of the hydroxyalkyl acrylate or methacryate with the polyisocyanate (or urethane poiyisocyanate) of functionality greater than 2.0 using methods conventional in the art for the preparation of polyurethanes.

Mixtures of two or more hydroxyalkyl acrylates and/or methacrylates may be used if desired.

The relative proportions of the reactants employed are preferably such as to provide at least 1 mole of the hydroxyalkyl acrylate or methacrylate per isocyanate group. Excess (unreacted) hydroxyalkyl acrylate or methacrylate is in general not objectionable in the reaction product since any such excess monomer may in many cases simply be incorporated in the copolymer produced in the subsequent copolymerisation process. The extent of any excess of hydroxyalkyl acrylate or methacrylate will therefore be determined in practice by economic considerations and the desirability or otherwise of incorporating the particular hydroxyalkyl acrylate or methacrylate in the final copolymer.

Catalysts used in the reaction between the hydroxyalkyl acrylate or methacrylate and the polyisocyanate (or urethane polyisocyanate) may be those known in the art of polyurethane production, for example tertiary amines and metal salts, especially di-n-butyltin dilaurate.

The reaction between the hydroxyalkyl acrylate or methacrylate and the polyisocyanate (or urethane polyisocyanate) is preferably carried out in the presence of an inert liquid diluent. A wide range of diluents may be used but most conveniently, in order to avoid the need for separation of the polyurethane polyacrylate or polymethacrylate, the reaction is carried out in the presence of methyl methacrylate as diluent.

Similarly, the copolymerisation of the polyurethane polyacrylate or polymethacrylate with methyl methacrylate may be carried out using techniques well known in the art of bulk polymerisation. A wide range of polymerisation initiators and concentrations thereof may be used, depending upon the desired temperature and rate of polymerisation. The catalyst may be, for example, a peroxide catalyst and this may be used in conjunction with a tertiary amine promoter. A suitable combination in many cases is, for example, dibenzoyl peroxide in conjunction with N,N-diethylaniline or N,N-dimethyl-para-toluidine.

The relative proportions of the polyurethane polyacrylate or polymethacrylate and the methyl methacrylate monomer to be copolymerised therewith will depend upon the required properties of the copolymer product and upon the copolymerisation conditions to be employed. In general the proportion of the polyurethane polyacrylate and/or polymethacrylate is preferably in the range from 10 to 90 (for example from 25 to 75, especially from 25 to 50) parts by weight per hundred total parts of polyurethane polyacrylate and/or polymethacrylate plus methyl methacrylate.

The mechanical properties (for example flexural strength and flexural modulus) of the products of the said copolymerisation may be acceptable for some intended uses without the need to introduce additional components. In some cases, however, it may be desirable to enhance the mechanical properties by the incorporation of fillers into the reaction mixture prior to copolymerization. Thus, for example, inorganic fillers may be incorporated in particulate, plate-like or fibrillar form. Suitable fillers include silica, calcium carbonate, talc, alumina trihydrate, mica, various clays and vermiculite. Glass fibre, either in continuous form or, for example, of aspect ratio from 10/1 to 500/1 (especially from 20/1 to 300/1) may be used as filler.

When an inorganic filler is used a suitable "coupling agent" may in some cases advantageously be incorporated to link the filler to the polymer matrix. Thus, for example, when the filler is silica a suitable silane coupling agent may be incorporated, for example γ-methacryl-oxypropyltrimethoxysilane.

Organic polymers, especially thermoplastic polymers, may also be incorporated in the reaction mixture prior to copolymerisation. One or more organic polymers may either be dissolved in the reaction mixture or added in particulate form, with or without the incorporation of inorganic fillers as already described. Polymers which may be incorporated include polymers and copolymers of alkyl acrylates and/or methacrylates (especially of acrylates and/or methacrylates containing from 1 to 8 carbon atoms in the alkyl group, for example methyl methacrylate); polymers and copolymers of styrene and α-methylstyrene (for example copolymers of styrene with butadiene); polymers and copolymers of acrylonitrile (for example copolymers of styrene with acrylonitrile); polymers and copolymers of vinyl chloride (for example copolymers of vinyl chloride with vinyl acetate) and polymers and copolymers of vinyl acetate. Incorporation of such polymers is often useful in reducing in-mould shrinkage.

In general, the proportion of organic polymer incorporated may be, for example, from 1 to 25 parts by weight (especially from 3 to 10 parts) per 100 parts of methyl methacrylate and polyurethane acrylate or methacrylate, the upper limit depending upon the desired viscosity of the mixture and the desired mechanical properties of the final product.

Other additives such as plasticisers and colourants may also be incorporated as is known in the art.

A particularly desirable use for the polyurethane polymethacrylate resins solutions in methyl methacrylate described herein is for the production of fibre-reinforced composites, especially glass-fibre-reinforced composites, by automated processes.

In such processes, for example closed mould processes using matched male and female moulds, glass fibre reinforcement (which may be chopped strand mat, continuous filament mat, woven continuous filament mat or any other variation of mat) is placed in one half of the mould, the mould is closed and resin is caused to flow through and wet-out the glass-fibre reinforcement either by sucking resin through by applying a vacuum to the closed mould cavity, or by pumping the resin through, or by a combination of vacuum-assisted pumping. Alternatively, liquid resin may be placed in the female half of the mould and the act of mould closure itself causes the resin to flow through the glass fibre.

For improved efficiency and speed in such processes it is advantageous that the resin shall flood and wet-cut the fibrous reinforcement rapidly, shall minimise the inclusion of air bubbles or voids, shall minimise "washing" of glass fibre (a term used in the industry to describe movement of glass-fibre caused by the flow of resin), and shall flow through the fibrous reinforcement under the minimum of pressure. These advantages are more readily obtained when the resin has low viscosity. Furthermore, it is desirable that, once the mould cavity is filled with resin, the resin shall polymerise rapidly to a product stiff enough and strong enough to be demoulded. It is an advantage of the polyurethane polyacrylates and polymethacrylates described herein that solutions in methyl methacrylate having very low viscosities may be used without compromising the rapid polymerisation characteristics.

In general, it is preferred that the viscosity of the mixture of polyurethane polyacrylate or polymethacrylate and methyl methacrylate is not above 200 centipoise; a viscosity not above 100 centipoise is especially preferred, for example from 5 to 50 centipoise. (Viscosities throughout this specification are as measured at 20° C. with a Brookfield viscometer at 60 rpm; 1 centipoise=1 mPa.s).

The relatively low solution viscosities which can be achieved with polyurethane polymethacrylate resins confer an additional advantage in that relatively high loadings of inorganic fillers can be included whilst maintaining the advantageous processing features described before which result from a low viscosity resin.

The polyurethane polymethacrylate resin solutions in methyl methacrylate can also be used in pultrusion processes.

The invention is illustrated by the following Examples. Unless otherwise stated all parts and percentages are by weight.

EXAMPLE 1

The polyisocyanate used in this Example was 'Suprasec' DND, a mixture of 4,4'-diisocyanatodiphenylmethane and related polymethylene polyphenyl polyisocyanates and having an average isocyanate functionality of 2.6 ('Suprasec' is a trade mark).

'Suprasec' DND (214 g) was dissolved in methyl methacrylate (421 g containing 60 ppm hydroquinone as polymerisation inhibitor) and 2.2 g di-n-butyltin dilaurate were added. The solution was stirred at ambient temperature and 229 g of 2-hydroxyethyl methacrylate (containing 300 ppm p-methoxyphenol as polymerisation inhibitor) were added rapidly (over a period of one minute).

The heat of reaction raised the temperature of the mixture to 75° C. after a period of 3 minutes from completion of addition of the 2-hydroxyethyl methacrylate.

The very low residual isocyanate content (measured by infra-red absorption) indicated that the reaction was substantially complete at this stage. After heating the mixture at 90° C. for a further 6 hours no detectable isocyanate remained.

The product was a brown solution in methyl methacrylate of the polyurethane polymethacrylate derived from 2-hydroxyethyl methacrylate and the polyisocyanate. A portion of this solution was copolymerised as follows to give a copolymer containing 40% of the polyurethane polymethacrylate and 60% of methyl methacrylate.

12.5 g methyl methacrylate (containing 0.94 g benzoyl peroxide) were mixed at ambient temperature with a 50 g portion of the solution of polyurethane polymethacrylate in methyl methacrylate (to which had been added 0.19 g N,N-dimethyl-p-toluidine) and the mixture was cast between glass plates at 36° C.

The mixture had a gel time of 60 seconds and the peak exotherm was reached after 105 seconds. The copolymer removed from the mould had a flexural strength of 160 $mN/m^2$ (measured at a sample span: depth ratio of 10:1 and with a moveable crosshead speed of 2 mm per min).

EXAMPLE 2

(a) Preparation of polyurethane polyisocyanate

The polyisocyanate used was 'Suprasec' DND having an average isocyanate functionality of 2.6 ('Suprasec' is a trade mark).

A 1-liter flask was charged with 100 g of molten polyethylene glycol (molecular weight 1000), 140 g of methyl methacrylate and 1 g of di-n-butyltin dilaurate. The mixture was stirred at ambient temperature and 66 g of 'Suprasec' DND in 65 g of methyl methacrylate were added slowly over a period of 10 minutes; during this addition the temperature of the mixture rose to 45°–50° C.

After the addition had been completed the mixture was stirred for a further 60 min, at the end of which period the temperature had fallen to 20°–25° C.

(b) Preparation of polyurethane polymethacrylate by reaction of 2-hydroxyethyl methacrylate with the polyisocyanate polyurethane 43.8 g of 2-hydroxyethyl methacrylate were added to the polyurethane polyisocyanate prepared as described in part (a) of this Example. The temperature of the reaction mixture rose to 45°–50° C. and this temperature was maintained for a further 180 min, at the end of which period no free isocyanate was detectable. The product was a solution containing equal parts by weight of polyurethane polymethacrylate and methyl methacrylate.

(c) Copolymerisation of the polyurethane polymethacrylate with methyl methacrylate Further methyl methacrylate was added to the polyurethane polymethacrylate solution prepared as described in part (b) to reduce the concentration of the polyurethane polymethacrylate in the solution to 40% by weight. Dibenzoyl peroxide (1.5% by weight) was added as catalyst and N,N-dimethyl-p-toluidine (0.3% by weight) was added as accelerator.

The mixture was cast into a glass cell (3 mm thick) at an initial temperature of 26° C. The peak exotherm was reached in 5 minutes. The copolymer produced was a rigid sheet readily removable from the cell shortly after the peak exotherm had been reached.

EXAMPLE 3

The general procedure of Example 2 was repeated with the following variations:

(a) The diol used was hexylene diol (2-methylpentan-2, 4-diol). 'Suprasec' DND (118.7) was reacted with 19.7 g of this diol in 212 g of methyl methacrylate as solvent; using di-n-butyltin dilaurate (1 g) as catalyst.

(b) The polyurethane polymethacrylate was prepared by reaction of the diol/polyisocyanate reaction product with 88.1 g of 2-hydroxypropyl methacrylate to give a solution in methyl methacrylate containing 50% by weight of the polyurethane polymethacrylate.

(c) Methyl methacrylate was added to the polyurethane polymethacrylate solution to reduce the concentration of the polyurethane polymethacrylate in the solution to 25% by weight. Copolymerisation was carried out as described in Example 2 (c). The peak exotherm was reached in 6.5 minutes and the copolymer produced was again a rigid sheet readily removable from the cell shortly after the peak exotherm had been reached.

EXAMPLE 4

The general procedure of Example 2 was followed, with the following variations:

(a) The diol used was Bisphenol A. 'Suprasec' DND (118.7 g) was reacted with 38 g of Bisphenol A in 230 g of methyl methacrylate as solvent, using di-n-butyltin dilaurate (1 g) as catalyst.

(b) The polyurethane polymethacrylate was prepared by reaction of the Bisphenol A/polyisocyanate reaction product with 81.8 g of 2-hydroxyethyl methacrylate to give a solution containing 50% by weight of the polyurethane polymethacrylate.

(c) Methyl methacrylate was added to the solution to give a solution containing 25% by weight of the polyurethane polymethacrylate.

Copolymerisation was carried out as described in Example 2 (c). The peak exotherm was reached in 6.75 minutes and the copolymer produced was again a rigid sheet readily removable from the cell shortly after the peak exotherm had been reached.

EXAMPLE 5

'Suprasec' DND (200 g) was dissolved in methyl methacrylate (250.8 g) containing 60 ppm of hydroquinone as polymerisation inhibitor, and 2.0 g di-n-butyltin dilaurate were added. The solution was stirred at ambient temperature and 200 g of 2-hydroxyethyl methacrylate, containing 300 ppm of paramethoxyphenol as polymerisation inhibitor, were added rapidly (over a period of one minute). The heat of reaction raised the temperature of the mixture to 80° C. after a period of 3 minutes from completion of addition of the 2-hydroxyethyl methacrylate. The very low residual isocyanate content (measured by infra-red absorption) indicated that the reaction was substantially complete at this stage. After heating the mixture at 90° C. for a further 5.5 hours no detectable isocyanate remained.

The product was a brown solution in methyl methacrylate (viscosity 70 centipoise) containing 60% by weight of the polyurethane polymethacrylate derived from 2-hydroxyethyl methacrylate and 'Suprasec' DND.

EXAMPLE 6

For purposes of comparison the polyurethane polymethacrylate derived from 2-hydroxyethylmethacrylate and 'Suprasec' DND was prepared in solution in styrene.

The procedure was identical with that described in Example 5 except that styrene (250.8 g containing 10–20 ppm t-butyl catechol) replaced methyl methacrylate. The product was a brown solution in styrene (viscosity 80 centipoise) containing 60% by weight of the polyurethane polymethacrylate.

EXAMPLE 7

Samples of the freshly prepared solution of polyurethane polymethacrytate resin prepared in Example 5 were diluted with methyl methacrylate (containing 60 ppm hydroquinone) to provide solutions containing 50%, 40% and 30% by weight of the resin. The viscosities were respectively 20, 10 and 5 centipoise.

Similarly, samples of the freshly prepared solution of polyurethane polymethacrylate resin prepared in Example 6 were diluted with styrene (containing 10–20 ppm tert-butyl catechol) to provide solutions containing 50%, 40% and 30% by weight of the resin. The viscosities were respectively 25, 10 and 5 centipoise.

The polymerisation exotherm behaviour of these solutions was characterised by measuring gel-times and gel-to-peak times according to the SPI general procedure for unsaturated polyester resins.

15 g aliquots of the resin solutions to be tested were divided into two equal parts. To one part was added 0.15 g dibenzoyl peroxide, and to the other, 0.05 g N,N'-dimethyl-para-toluidine. The polymerisation of the resin/monomer solution was initiated by mixing the two parts together in a glass vial of internal diameter approximately 25 mm.

The onset of gelation (the gel-time) was determined by observing the change in rheological behaviour on immersion and withdrawl of a 1 mm diameter wooden stick. The change in rheology on gelation was quite distinctive and sudden and the time at which it occurred could be measured to a precision of about ±15%.

The 'peak time' is the time taken after mixing the two parts of the 15 g aliquot (initiation) for the polymerisation exotherm to reach its maximum temperature. The gel-to-peak time is the difference between the peak time and the gel-time. The exotherm was measured by a chromel-alumel thermocouple immersed at the centre of the resin/monomer sample.

Polymerisation exotherms were measured with the resin solutions stored in a thermostatted water bath prior to initiation. Comparative data were obtained with the water bath at 23° C. and at 60° C.

The gel-times, gel-to-peak times and peak temperatures recorded are shown in Table I.

The data illustrate the comparable gel times and the much shorter gel-to-peak times obtained when methyl methacrylate is used in preference to styrene as the comonomer for copolymerisation with the polyurethane polymethacrylate resin.

Furthermore, the solutions of the polyurethane polymethacrylate resin in methyl methacrylate were storage stable for much longer periods than the corresponding solutions in styrene. For example, the solution of 60% polyurethane polymethacrylate in methyl methacrylate prepared in Example 5, when stored in an amber glass bottle at ambient temperature did not gel until 4 weeks had elapsed. By way of comparison the 60% solution of polyurethane polymethacrylate in styrene prepared in Example 6 gelled in less than 24 hours when stored under the same conditions.

TABLE I

| Temperature °C. | Concentration of Polyurethane Polymethacrylate Resin in Resin/Comonomer Solution (% by weight) | Comonomer | Gel Time S | Gel-To Peak Time S | Peak Temp °C. |
|---|---|---|---|---|---|
| 23 | 30% | Styrene | 290 | 535 | 90 |
| | | Methyl Methacrylate | 225 | 120 | 175 |
| 23 | 40% | Styrene | 165 | 205 | 140 |
| | | Methyl Methacrylate | 145 | 80 | 185 |
| 23 | 50% | Styrene | 95 | 130 | 155 |
| | | Methyl Methacrylate | 70 | 65 | 185 |
| 60 | 30% | Styrene | 65 | 150 | 200 |
| | | Methyl Methacrylate | 30 | 43 | 180 |

TABLE I-continued

| Temperature °C. | Concentration of Polyurethane Polymethacrylate Resin in Resin/Comonomer Solution (% by weight) | Comonomer | Gel Time S | Gel-To Peak Time S | Peak Temp °C. |
|---|---|---|---|---|---|
| 60 | 40% | Styrene | 35 | 110 | 150 |
| | | Methyl Methacrylate | 20 | 35 | 185 |
| 60 | 50% | Styrene | 20 | 65 | 160 |
| | | Methyl Methacrylate | 15 | 35 | 190 |

EXAMPLE 8

The polyurethane polyacrylate resin derived from 2-hydroxyethyl acrylate and 'Suprasec' DND was prepared as a solution in methyl methacrylate by a method similar to that used in Example 5 except that (i) the 2-hydroxyethyl methacrylate was replaced by 2-hydroxyethyl acrylate (178.5 g) containing 400 ppm of paramethoxyphenol and (ii) the weight of methyl methacrylate was 238.5 g.

The product was a brown solution in methyl methacrylate (viscosity 75 centipoise) containing 60% by weight of the polyurethane polyacrylate.

EXAMPLE 9

For purposes of comparison the polyurethane polyacrylate resin derived from 2-hydroxyethyl acrylate and 'Suprasec' DND was prepared as a solution in styrene.

The procedure was identical with that described in Example 8 except that styrene (238.5 g) containing 10–20 ppm t-butyl catechol replaced the methyl methacrylate.

The product was a brown solution in styrene containing 60% by weight of the polyurethane polyacrylate.

EXAMPLE 10

Samples of the solution of polyurethane polyacrylate resin prepared in Example 8 were diluted with methyl methacrylate (containing 60 ppm hydroquinone) to provide solutions containing 50%, 40% and 30% of the resin.

Similarly, samples of the polyurethane polyacrylate resin prepared in Example 9 were diluted with styrene (containing 10–20 ppm tert-butyl catechol) to provide solutions containing 50%, 40% and 30% of the resin.

The polymerisation of these solutions was characterised as described in Example 7. The gel times, gel-to-peak times and peak temperatures were as shown in Tables II and III. The bath temperature in all cases was 21° C.

TABLE II

| SOLUTIONS IN METHYL METHACRYLATE AS COMONOMER | | | |
|---|---|---|---|
| Concentration of Polyurethane Polyacrylate in Resin/Comonomer Solution % by weight | Gel Time S | Gel-To Peak Time S | Peak Temp |
| 30 | 390 | 200 | 168 |

TABLE II-continued

| SOLUTIONS IN METHYL METHACRYLATE AS COMONOMER | | | |
|---|---|---|---|
| Concentration of Polyurethane Polyacrylate in Resin/Comonomer Solution % by weight | Gel Time S | Gel-To Peak Time S | Peak Temp |
| 40 | 200 | 120 | 176 |
| 50 | 130 | 80 | 172 |

TABLE III

| SOLUTIONS IN STYRENE AS COMONOMERS | | | |
|---|---|---|---|
| Concentration of Polyurethane Polyacrylate in Resin/Comonomer Solution % by weight | Gel Time S | Gel-To Peak Time S | Peak Temp °C. |
| 30 | 325 | 460 | 130 |
| 40 | 205 | 195 | 142 |
| 50 | 140 | 140 | 158 |

EXAMPLE 11

This example shows the preparation of a glass fibre/copolymer laminate by resin injection moulding. The resin used was the polyurethane polymethacrylate derived from 2-hydroxyethyl methacrylate and 'Suprasec' DND. This resin was prepared as a solution in methyl methacrylate by the method described in Example 1. The solution was diluted with methyl methacrylate to give a solution containing 30 parts of the resin per 100 total parts of methyl methacrylate and resin. Alumina trihydrate was then dispersed in the diluted solution to give a feed dispersion containing 50 parts of alumina trihydrate per 50 parts of the diluted solution.

A 3.2 mm glass/copolymer laminate was prepared as follows.

Three layers of chopped-strand glass fibre mat (450 g $m^{-2}$) were placed between nickel plates (20 cm×20×32 mm) and the mould was sealed using a 3.2 mm silicone rubber spacing gasket.

Benzoyl peroxide (1.5%) and N,N-dimethylparatoluidine (0.5%) were added to the feed dispersion just described and the mixture was pumped into the mould at 20° C. The time required to fill the mould was 30 seconds.

Gelation occurred 110 seconds after the mould had been filled and the peak exotherm was reached 205 seconds after the mould had been filled. A rigid laminate was demoulded 210 seconds after the mould had been filled. The approximate composition of the laminate was 30% glass fibre, 35% alumina trihydrate and 35% resin/methyl methacrylate copolymer. The flexural strength of the laminate was 175 $MN/m^2$ and the flexural modulus at 20° C., measured at a span to depth ratio of 20:1 was $9\times10^9 N/m^2$.

EXAMPLE 12

This example shows the effectiveness of poly(methylmethacrylate) in reducing in-mould shrinkage.

A solution in methyl methacrylate of the polyurethane polymethacrylate resin derived from 2-hydroxyethyl methacrylate and 'Suprasec' DND was prepared by the method described in Example 1. The solution was diluted with methyl methacrylate to give a solution containing 30 parts of the resin per 100 total parts of methyl methacrylate and resin. 5.0 g of poly(methyl methacrylate) ('Diakon' LG156; 'Diakon' is a trade mark) were added to 50 g of this solution and dissolved by shaking at 40°–50° C., to give a clear solution (viscosity 33 centipoise). To this clear solution were added 50 g of a silane-coated alumina trihydrate (2–50 micron particle size) which was dispersed readily by shaking. The viscosity of this dispersion was 129 centipoise. The density of the dispersion at 20° C. was 1.420 g/ml (determined using a relative density bottle).

Benzoyl peroxide (0.75 g) was dissolved in the dispersion, followed by N,N-dimethyl-p-toluidine (0.15 g). The product was then transferred rapidly into a mould immersed in a water bath maintained at 60° C. The mould consisted of two 3 mm thick glass plates (18×15 cm) separated by a 4 mm thick gasket. The temperature of the polymerising dispersion was monitored by a thermocouple. The 'peak time' was 105 sec. After polymerisation the polymerised product obtained was removed from the mould and its density was found to be 1.440 g/ml (determined by weighing in air and in water at 20° C.).

The volume shrinkage due to polymerisation was calculated from the formula $$V/100=(d_2-d_1)d_2$$

where

V is the volume shrinkage expressed as ml per 100 ml dispersion $d_1$ is the density of the dispersion (g/ml) and $d_2$ is the density of the de-moulder product(g/ml).

Thus the volume shrinkage was $$V = 100\,(1.440 - 1.420)/1.440 = 1.39 \text{ ml/100 ml dispersion.}$$

By way of comparison the procedure was repeated except that the poly (methyl methacrylate) was omitted.

The 'peak time' was 118 sec.

The density of the initial dispersion was 1.432 g/ml and the density of the de-moulded product was 1.584 g/ml.

Thus the volume shrinkage was $$V = 100\,(1.584 - 1.432)/1.584 = 9.6 \text{ ml/100 ml dispersion.}$$

EXAMPLE 13

A mould was constructed from a pair of rectangular steel plates, each 5 mm thick, separated by a silicone rubber spacing gasket 3 mm thick. The dimensions of the mould cavity were 15 mm×11 mm×3 mm. The mould was immersed in water bath maintained at 20° C.

A solution in methyl methacrylate of the polyurethane polymethacrylate resin derived from 2-hydroxyethyl methacrylate and 'Suprasec' DND was prepared as described in Example 5. Portions of the solution were diluted with methyl methacrylate to provide test solutions containing 60%, 50% and 40% of the resin.

Polymerisation was carried out using 60 g aliquots of the test solution, each divided into two equal portions. To one portion was added 0.9 g dibenzoyl peroxide and to the other was added 0.3 g N,N-dimethyl-p-toluidine. After thermostatting at 20° C. the two portions were mixed, shaken thoroughly and immediately charged to the mould. The time at which peak temperature occurred was noted and the polymer product was demoulded as quickly as possible at this stage. Immediately after removal of the product from the mould the hardness of polymer specimen was measured and the hardness thereafter was measured at intervals up to a period of 1 hour after the initial charging of the solutions to the mould while the specimen was stored at ambient temperature (20°–22° C.).

Hardness was measured using a Barcol Hardness Tester calibrated to read 100 on glass (the higher the reading the harder the specimen).

By way of comparison, the procedure was repeated using solutions in styrene of the same resin prepared as described in Example 6. Portions were diluted with styrene to provide test solutions containing 60%, 50%, and 40% of the resin.

The polymerisation characteristics (time to peak temperature and peak temperature) are shown in Table IV, which also shows the time at which the specimens were demoulded and the hardness immediately after demoulding. This demonstrates the much greater hardness upon demoulding of the copolymers of the resin with methyl methacrylate compared with those with styrene.

TABLE IV

| Concentration of Polyurethane Polymethacrylate Resin in Resin/Comonomer Solution (% by weight) | Co-monomer | Time to peak S | Peak Temp. °C. | De-moulded at S | Barcol Hardness at De-mould |
|---|---|---|---|---|---|
| 60% | Styrene | 180 | 41 | 210 | 0 |
| | Methyl Methacrylate | 80 | 85 | 90 | 34 |
| 50% | Styrene | 330 | 25 | 360 | 0 |
| | Methyl Methacrylate | 140 | 88 | 150 | 33 |
| 40% | Styrene | * | 23 | 600 | 0 |
| | Methyl Methacrylate | 240 | 67 | 240 | 33 |

*peak too shallow to measure

The rate of development of hardness at ambient temperature substantially to demoulding is shown in Table V. In this table, "Concentration" denotes the concentration of the polyurethane polymethacrylate resin in the resin/comonomer solution and 'MMA' denotes methyl methacrylate. Time is measured from initial charging of the solutions to the mould.

TABLE V

MEASUREMENTS OF BARCOL HARDNESS

| | | CONCENTRATION | | | | | |
|---|---|---|---|---|---|---|---|
| | Co- | 60% | | 50% | | 40% | |
| Time (min) | Monomer | MMA | Styrene | MMA | Styrene | MMA | Styrene |
| 1.5 | | 34* | — | — | — | — | — |
| 2.5 | | 42 | — | 33* | — | — | — |
| 3.5 | | 44 | 0* | 37 | — | — | — |
| 4.0 | | 45 | 3 | 41 | — | 32* | — |
| 5.0 | | 46 | 10 | 43 | — | 40 | — |
| 6.0 | | 47 | 15 | 45 | 0* | 43 | — |
| 10.0 | | 49 | 24 | 48 | 12 | 49 | 0* |

TABLE V-continued

| MEASUREMENTS OF BARCOL HARDNESS | | | | | | | |
|---|---|---|---|---|---|---|---|
| | | CONCENTRATION | | | | | |
| | Co- | 60% | | 50% | | 40% | |
| Time (min) | Mono-mer | MMA | Sty-rene | MMA | Sty-rene | MMA | Sty-rene |
| 15.0 | | 50 | 29 | 50 | 20 | 52 | 0 |
| 30.0 | | 53 | 33 | 54 | 25 | 53 | 0 |
| 60.0 | | 57 | 35 | 60 | 28 | 54 | 0 |

*immediately after demoulding

We claim:

1. A method of producing a moulded plastics product by in-mould copolymerisation of an unsaturated urethane compound and a vinyl monomer copolymerisable therewith, wherein (a) the unsaturated urethane compound is a polyurethane polyacrylate or polymethacrylate resin derived from a hydroxyalkyl acrylate or methacrylate by reaction of hydroxyl groups thereof with the isocyanate groups of a polyisocyanate from the group consisting of (i) [free from urethane groups and] *polymethyl polyphenyl* polyisocyanates having an isocyanate functionality greater than 2.0 and (ii) urethane [polyisocyanate] *polyisocyanates* derived from a *polymethylene polyphenyl* polyisocyanate *or diphenylmethane-4,4'-diisocyanate* by reaction thereof with the hydroxyl groups of [an aliphatic alcohol] *a polyhydroxy compound* having up to 3 hydroxyl groups, the said urethane polyisocyanates having an isocyanate functionality greater than 2.0 and *in such proportions that at least one mole of hydroxyalkyl acrylate or methacrylate is used for each 623 g of unsaturated urethane compound and*

(b) the vinyl monomer is methyl methacrylate, *whereby in-mould polymerization can be accomplished in less than 10 minutes.*

2. A method according to claim 1, wherein the polyurethane polyacrylate or polymethacrylate resin is derived from a hydroxyalkyl acrylate or methacrylate by reaction of hydroxyl groups thereof with the isocyanate groups of a polymethylene polyphenyl polyisocyanate.

3. A method according to claim 1, wherein the polyurethane polyacrylate or polymethacrylate resin is derived from a polyurethane polyisocyanate which is in turn derived from a polyisocyanate having an isocyanate functionality greater than 2.0 by reaction thereof with an aliphatic diol or triol.

4. A method according to claim 3, wherein the polyisocyanate reacted with the diol or triol is a polymethylene polyphenyl polyisocyanate.

5. A method according to claim 1, wherein claims, characterised in that the hydroxyalkyl acrylate or methacrylate contains from 2 to 4 carbon atoms in the hydroxyalkyl group.

6. A method according to claim 1, wherein claims, characterised in that the proportion of the polyurethane polyacrylate and/or polymethacrylate resin is in the range from 10 to 90 parts by weight per 100 total parts of methyl methacrylate and the said resin.

7. A method according to claim 6, wherein the proportion of the said resin is in the range from 25 to 50 parts by weight per 100 total parts of methyl methacrylate and the said resin.

8. A method according to claim 1, wherein the mixture to be polymerised contains an organic polymer.

9. A method according to claim 8, wherein the organic polymer is poly(methyl methacrylate).

10. A method according to claim 8 or claim 9, characterised in that the proportion of the polymer is from 1 to 25 parts by weight per 100 total parts of methyl methacrylate and polyurethane acrylate and/or methacrylate resin.

11. A method according to claim 1, wherein the mixture to be polymerised contains an inorganic filler.

12. A method according to claim 11, wherein the filler comprises glass fibre.

13. A polymerisable composition comprising an unsaturated urethane compound and a vinyl monomer copolymerisable therewith, wherein (a) the unsaturated urethane compound is a polyurethane polyacrylate or polymethacrylate resin derived from a hydroxyalkyl acrylate or methacrylate by reaction of hydroxyl groups thereof with the isocyanate groups of a polyisocyanate from the group consisting of (i) polymethylene polyphenyl polyisocyanates having an isocyanate functionality greater than 2.0 and (ii) urethane polyisocyanates derived from a polymethylene polyphenyl polyisocyanate *or diphenylmethane-4,4-diisocyanate* by reaction thereof with the hydroxyl groups of [an aliphatic alcohol] *a polyhydroxy compound* having up to 3 hydroxyl groups, the said urethane polyisocyanates having an isocyanate functionality greater than 2.0 and*in such proportions that at least one mole of hydroxyalkyl acrylate or methacrylate is used for each 623 g of unsaturated urethane compound and*

(b) the vinyl monomer is methyl methacrylate, *the composition being rapidly curing so that in-mould polymerization can be accomplished in less than 10 minutes.*

14. A composition according to claim 13, wherein the polyurethane polyacrylate or polymethacrylate resin is derived from a polyurethane polyisocyanate which is in turn derived from a polymethylene polyphenyl polyisocyanate having an isocyanate functionality greater than 2.0 by reaction thereof with an aliphatic diol or triol.

15. A composition according to claim 13 or claim 14, wherein the polyurethane polyacrylate or polymethacrylate resin is derived from a hydroxyalkyl acrylate or methacrylate containing from 2 to 4 carbon atoms in the hydroxyalkyl group.

16. A composition according to claim 13, wherein the proportion of the polyurethane polyacrylate and/or polymethacrylate resin is from 10 to 90 parts by weight per 100 total parts of methyl methacrylate and the said resin.

17. A composition according to claim 16, wherein the proportion of the said resin is from 25 to 50 parts by weight per 100 total parts of methyl methacrylate and the said resin.

18. A composition according to claim 18, wherein the composition also comprises an organic polymer.

19. A composition according to claim 18, wherein the organic polymer is poly(methyl methacrylate).

20. A composition according to claim 18, wherein the proportion of the organic polymer is from 1 to 25 parts by weight per 100 total parts of methyl methacrylate and the polyurethane acrylate and/or methacrylate resin.

21. A method according to claim 1, wherein the isocyanate functionality of the polyisocyanate is at least 2.2.

22. A method according to claim 21, wherein the isocyanate functionality of the polyisocyanate is at least 2.5.

23. A composition according to claim 13, wherein the isocyanate functionality of the polyisocyanate is at least 2.2.

24. A composition according to claim 23, wherein the isocyanate functionality of the polyisocyanate is at least 2.5.

*25. A method according to claim 1 wherein the polyhydroxy compound is a diol of formula H O-Q-O H, where Q is an alkylene or polyalkylene ether radical.*

*26. A method according to claim 1 wherein the polyhydroxy compound is a dihydric phenol or bis-phenol.*

*27. A method according to claim 1 wherein the polyhydroxy compound is a triol or an ethoxylated or propoxylated derivative thereof.*

*28. A composition according to claim 13 wherein the polyhydroxy compound is a diol of formula H O-Q-O H, where Q is an alkylene or polyalkylene ether radical.*

*29. A composition according to claim 13 wherein the polyhydroxy compound is a dihydric phenol or bis-phenol.*

*30. A composition according to claim 13 wherein the polyhydroxy compound is a triol or an ethoxylated or propoxylated derivative thereof.*

* * * * *